July 5, 1927.
L. E. CORYELL
LEVEL
Filed Sept. 22, 1926
1,635,034
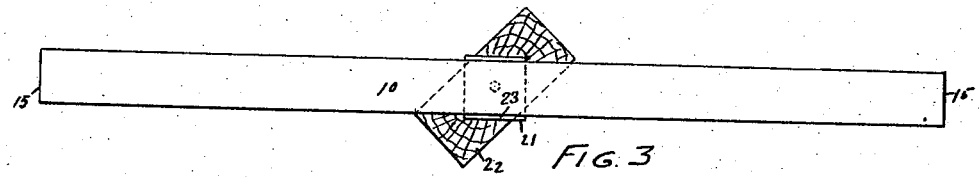
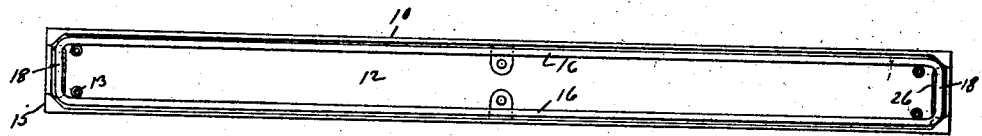
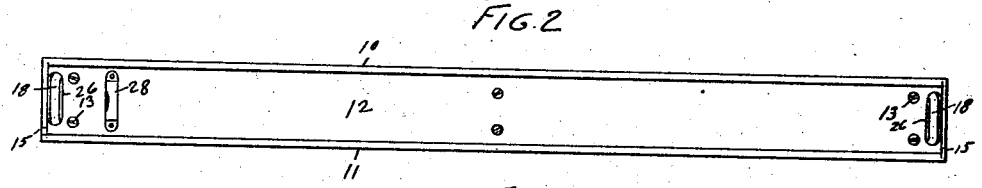
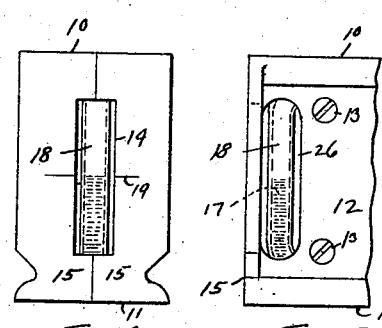
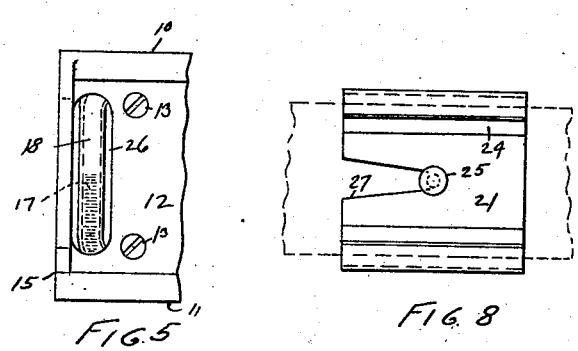
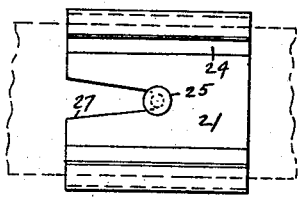
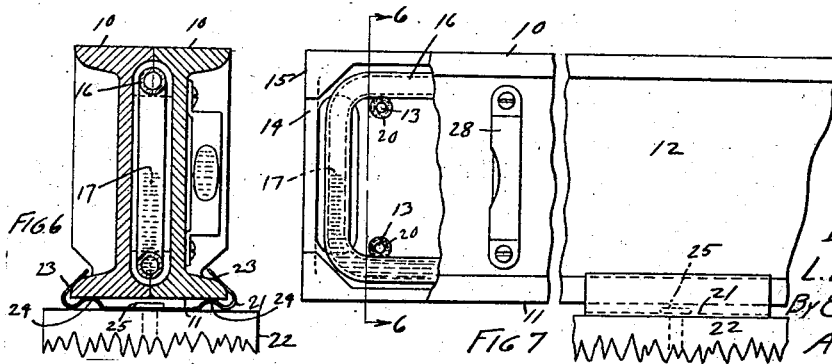
INVENTOR
L. E. CORYELL
ATTORNEY Patented July 5, 1927.

1,635,034

UNITED STATES PATENT OFFICE.

LEWIS E. CORYELL, OF PORTLAND, OREGON.

LEVEL.

Application filed September 22, 1926. Serial No. 136,935.

This invention relates generally to levels such as are used by mechanics, and particularly to a special form of hand level wherein the leveling element is self-adjusting, by means of which extreme accuracy can be obtained by even the unexperienced user.

The first object of this invention is to provide an exceedingly simple and efficient hand level in which levels are taken or read by a sighting action instead of by the position of a bubble, as is ordinarily the case.

The second object is to so construct the level that it can be pivotally mounted on a support and swung around in a horizontal plane for the purpose of establishing a number of levels outside of a given plane.

The third object is to provide a mounting for the level which can be fastened on an ordinary stake by means of a hammer and nail, and in which no injury can be caused to the level when mounting same, due to the fact that the level and its mounting must be separated during the operation.

The fourth object is to provide a hand level having all of the characteristics of the ordinary hand level such as leveling and plumbing by means of the ordinary bubble action, as well as other properties not possessed by the ordinary hand level.

These, and other objects, will become more apparent from the specification following as illustrated in the accompanying drawing, in which:

Figure 1 is a side elevation of the level of which Figure 2 is an elevation showing the front half of the level removed to disclose the level tube. Figure 3 is a plan of the level showing same mounted on a stake. Figure 4 is an end elevation of the level of which Figure 5 is a fragmentary side elevation taken near one end thereof. Figure 6 is a vertical transverse section taken along the line 6—6 in Figure 7. Figure 7 is a fragmentary side elevation of the level having one end broken away to disclose the interior at an enlarged scale, and also showing the relation of the level and its mounting. Figure 8 is a plan of the level mounting showing the outlines of the level in dotted line.

Similar numbers of reference refer to similar parts throughout the several views.

Referring in detail to the drawing, the level itself consists of two longitudinal frame members comprised of the upper and lower straight edges 10 and 11 and a joining web 12. The two sections are joined together by means of screws 13, which may be further supported by means of dowels if desired. When the two members are united there exists a space between the members 12 which terminates at each end in an opening 14, which is formed in the ends 15 of the level. The openings 14 provide an unobstructed view throughout the length of the level.

Between the members 12 is placed a somewhat rectangular closed glass tube 16 containing a sufficient amount of colored liquid (preferably alcohol) 17 so that when the edges 10 and 11 are exactly level that the surface of the liquid 17 in the upright portions 18 of the tube 16 will register with the level marks 19 formed in the middle of the vertical height of the ends 15.

It is preferable to provide felt or other resilient pads 20 at intervals along the glass tube 16 to prevent breaking under rough usage.

A sheet metal base 21 is used as a mounting for the level on a stake 22, or other suitable support, with inturned edges 23 which engage the sides of the level. It is preferable to provide the member 21 with raised portions 24 to insure clearance for the head of the nail 25.

Openings 26 are provided on opposite sides and at each end of the level in the members 12 to facilitate the reading thereof from the sides of the level, as well as from the ends.

It is also preferable to provide a slot 27 in the member 21 to enable the user to drive the mounting off of the stake without withdrawing the nail 25. A plumbing bubble 28 is also mounted on the side of one of the webs 12 in order to enable the level to be used as a plumb.

Since it will be somewhat difficult to see through the rounded portion 18 of the glass tube it may in some instances be preferable to flatten same, which can readily be done without departing from the spirit of this invention.

In operation if it is desired to establish a line of levels this device is set up by driving a nail through the slot 27 of the member 21 into a stake 22, or other suitable support, and then slipping the level firmly into place on the mounting 21. Whether or not the level is placed in an exactly horizontal position, either longitudinally or transversely, is unimportant as the liquid 17 in the opposite members 18 will constantly find a common level, across which the user sights with his eye to the object being leveled, or to a measuring rod placed thereon, which gives him the actual distance above or below his datum plane. All he need do is to mount the level near enough to the horizontal so that the liquid will show in the end glasses. Tilting or canting of the level will not in any way affect the accuracy of the reading taken thereon; in fact, it need not be level at all, in the sense referred to when speaking of the ordinary tripod level, in which case it is equally important to first level the instrument in perpendicular vertical planes.

If it is desired to dispense with the sighting action, as for a short object or for places where it would not be practical to sight, the level is merely placed on the object, as would be the ordinary hand level, and the relation between the surface of the liquid 17 and the mark 19 at one or both ends of the level is noted.

It can be seen that by this construction it is possible to secure the same accuracy that could be obtained only from a hand level having a bubble many times its present length.

Another advantage in this device arises from the fact that it cannot get out of adjustment, even if the liquid containing tube should become entirely displaced within the level. This will not affect the relation between the liquids in the opposite ends of the level and it is upon these relative relations that the accuracy of this tool depends.

While there is illustrated one form of mounting 21 for the purpose of holding the level, it is clear that a great many changes may be made in this and other details without departing from the spirit of this invention.

I am aware that many different forms of hand levels have been constructed in the past; I therefore do not intend to cover such devices broadly, but I do intend to cover all such forms and modifications thereof as fall fairly within the appended claim.

I claim:

A level having, in combination, a longitudinal split frame having a groove formed between the parts thereof, said groove having the side portions of each end thereof partially closed; a transparent closed tube member, the ends of which are closed to said partially closed frame ends, said transparent tube member having a colored liquid therein sufficient to extend approximately midway in the ends of said rectangular frame when horizontally placed in a vertical plane; and means for pivotally mounting said level on a fixed support, said means consisting of a base having a V slot formed in the bottom thereof for engaging the under side of a nail-head, said base having upwardly and inwardly turned sides adapted to slidably engage the lower edge of said straight edge.

LEWIS E. CORYELL.